C. B. SHELDON.
ANTI-FRICTION BEARINGS.

No. 171,874. Patented Jan. 4, 1876.

WITNESSES:
C. Neveux
Alex. F. Roberts

INVENTOR:
C. B. Sheldon
BY
ATTORNEYS.

N. PETERS, PHOTO-LITHOGRAPHER, WASHINGTON, D. C.

UNITED STATES PATENT OFFICE.

CEVEDRA B. SHELDON, OF NEW YORK, N. Y.

IMPROVEMENT IN ANTI-FRICTION BEARINGS.

Specification forming part of Letters Patent No. 171,874, dated January 4, 1876; application filed November 19, 1875.

*To all whom it may concern:*

Be it known that I, CEVEDRA B. SHELDON, of the city, county, and State of New York, have invented a new and Improved Anti-Friction Machinery-Bearing, of which the following is a specification:

My invention consists of anti-friction bearings for machinery, composed of a reticulated or perforated metallic base or foundation and a coating of plumbago, the latter being united to the foundation-piece by cement and compression. The foundation-piece consists of a sheet or thin cast-metal plate, of suitable size and form to suit the journal or other object to which it is to be applied, with holes punched or otherwise formed in it; or it may be a piece of strong woven wire bent into the form required, to which the plumbago, being made plastic by the cement, is applied on one or both sides, and then subjected to pressure sufficient to condense it properly, and to fill the openings and unite the coatings of both sides, so as to firmly attach and secure the plumbago to the foundation-metal, and thus make substantial and practical linings for journal-boxes, the said linings being of greater or less thickness, according to the sizes of the bearings and the service to which they are subject.

Figure 1:
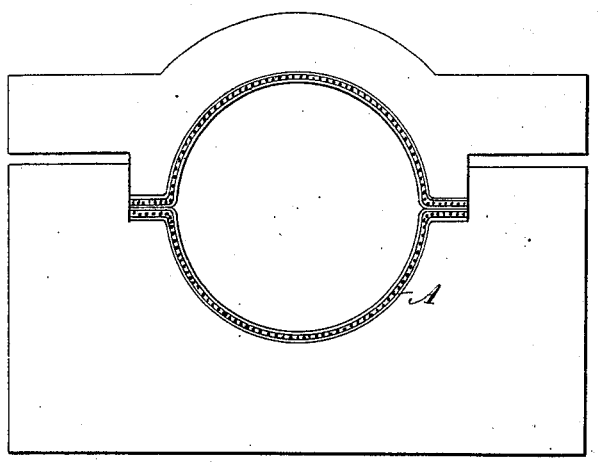
Figure 3:
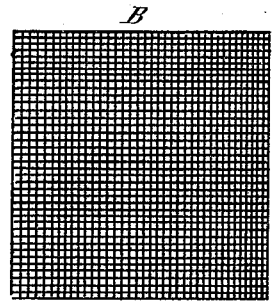
Figure 2:
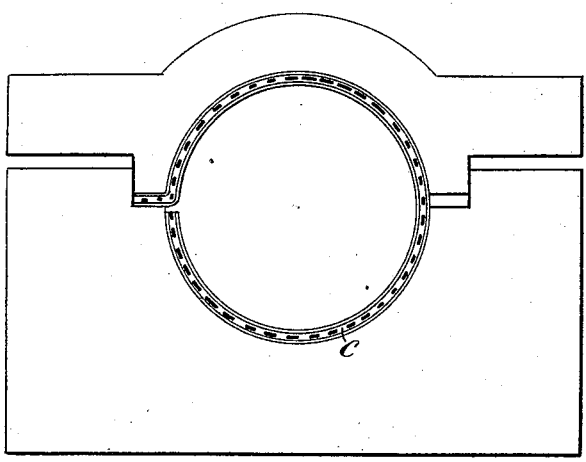
Figure 4:
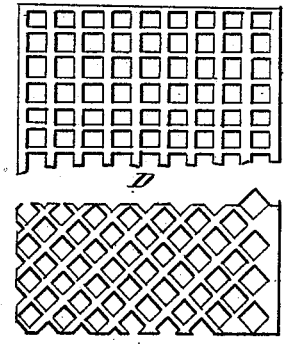

Figures 1 and 2 are end elevations of journal-bearings provided with linings of my invention, and Figs. 3 and 4 are plan views of foundation-plates of different kinds.

Similar letters of reference indicate corresponding parts.

A represents bearings or box-linings, the foundation-plates of which are of woven wire, B, and C represents the same made on an open cast-metal plate, D.

The essential idea of the invention is to combine the plumbago with a strong supporting medium capable of maintaining it in suitable form and condition for machinery-bearings, the difficulty being to make it sufficiently compact, hard, and unyielding to prevent displacement of the particles by the rubbing action of the journals, &c.

The open or perforated metal plate or woven-wire foundation which I propose offers the best possible means cheaply attainable for this purpose, and with a good paste of flour, or rubber cement, and adequate pressure, the plumbago is made to adhere with sufficient solidity and tenacity to insure success.

I am aware that plumbago has been used with vegetable or animal fiber by means of soda, potash, or other size, and also with paraffine, burnt hair, and ivory-dust; but

What I claim is—

Plastic plumbago compressed into the interstices of metal to form an anti-friction bearing.

CEVEDRA B. SHELDON.

Witnesses:
JAMES H. HUNTER,
ALEX. F. ROBERTS.